United States Patent [19]

Howe et al.

[11] Patent Number: 4,697,696
[45] Date of Patent: Oct. 6, 1987

[54] PLATE BELT CONVEYOR

[75] Inventors: Michael Howe, Wesel-Bislich; Waldemar Schwarz, Kamp-Lintfort, both of Fed. Rep. of Germany

[73] Assignee: Aumund-Fordererbau GmbH Maschinenfabrik, Rheinberg, Fed. Rep. of Germany

[21] Appl. No.: 779,340

[22] Filed: Sep. 23, 1985

[30] Foreign Application Priority Data

Oct. 18, 1985 [DE] Fed. Rep. of Germany ....... 3438231

[51] Int. Cl.⁴ ............................................. B65G 17/10
[52] U.S. Cl. ..................................... 198/822; 198/851
[58] Field of Search ......................... 198/822, 850, 851

[56] References Cited

U.S. PATENT DOCUMENTS 2,936,063  5/1960  Hemsley ......................... 198/822 X
3,243,035  3/1966  Ratkowski ......................... 198/822

FOREIGN PATENT DOCUMENTS 544460   2/1956  Belgium ........................... 198/822
509656   2/1956  Fed. Rep. of Germany ...... 198/822
967670   7/1956  Fed. Rep. of Germany .
946515   8/1956  Fed. Rep. of Germany .
1021789 12/1957  Fed. Rep. of Germany .
1032165  6/1958  Fed. Rep. of Germany .
2113023  6/1973  Fed. Rep. of Germany .
3206802  9/1985  Fed. Rep. of Germany .
1090987  4/1955  France .
748728   5/1956  United Kingdom ............... 198/822
537907   2/1970  U.S.S.R. ............................ 198/851
609682   5/1978  U.S.S.R. ............................ 198/822

Primary Examiner—Robert J. Spar
Assistant Examiner—Jonathan D. Holmes
Attorney, Agent, or Firm—Armstrong, Nikaido, Marmelstein & Kubovcik

[57] ABSTRACT

In a plate belt conveyor for steep conveying in the overlapping region of adjacent plates (5, 6), a pocket (15) is provided which is formed by a seam (12) and an upward projecting leg (8) of the lower rear plate end as well as a roof-like arch (9) projecting over the seam (12) and the leg (8) with downward directed leg (10) of the front upper plate end. The rising flank of the seam (12) is concentrically formed with respect to the chain fulcrum (14) in such a manner that when the leading plate (6) is angled relative to the trailing plate (5), the pocket (15) firstly remains closed and opens only on a further angling of the plate.

6 Claims, 5 Drawing Figures

PLATE BELT CONVEYOR

BACKGROUND OF THE INVENTION

The invention relates to a plate belt conveyor for steep conveying comprising mutually overlapping plates which are disposed on flat link chains. The pitch of the plates corresponds to the chain pitch, wherein the plates in the overlapping region are provided at one end of their transverse edges with an upward directed leg and at the other end with a roof-like arch which spans the upward directed leg. A steep downward directed leg extends from the roof like arch. The downward directed leg together with the roof-shaped arch and the upward directed leg form a pocket which opens in the reversal of the conveyor. With a parallel arrangement of the plates, the lower end of the downward directed leg of the plate lying therebelow lies opposite in a sealing manner maintaining at most a slight spacing.

An apron conveyor or plate belt conveyor constructed as a short cell belt with contactless overlapping of the plates is known from German Patent No. DE-OS 2,113,023. The plate is made planar in the rear lower overlapping region in the conveying direction. In particular, when the conveyor is ascending steeply with the known plate belt conveyor, a disadvantage arises because the plate belt does not have the necessary sealing properties. With steeply rising conveying, the material to be conveyed tends to move through the slot of greater or lesser magnitude present between the lower edge of the downward directed leg and the plate bottom of the following plate disposed therebelow. However, if material does pass through, the slot is retained by the upward directed leg of the rear plate end. When the plate belt now reaches the upper reversal station, the leading plate is bent at the chain wheel and as a result the plates lift off each other in the overlapping region and the pocket formed in the overlapping region is opened. Since, however, the opening of the pocket is effected at an instant at which the discharge of the belt has not yet taken place, and the plates still have a great inclination, it necessarily follows that on opening, the pocket material can shoot into the pocket and then necessarily slides downwardly and can partly shoot over the upward directed leg which leads to an undesirable soiling and wear of the apparatus.

In a further known design of a plate belt conveyor, the upward directed leg of the rearward disposed plate end has extending thereover a roof-like arch which extends concentrically to the chain fulcrum. The front end of the plates have a parallel arrangement and lies sealingly on the neighboring plate. In this case as well, on passing over the upper chain wheel, the pocket formed in the overlapping region opens so that, with ascending conveying, material can shoot into the pocket. Part of the material will pass through the slot present between the upward directed leg and the roof-shaped arch. On further opening of the pocket, the material which has penetrated into the pocket is again pushed forward and is partly drawn into the slot. This again results in an undesirably high wear and soiling.

French reference FR-PS No. 1,090,987 discloses a plate belt conveyor in which the associated plate ends are disposed concentrically about the chain fulcrum. The concentric overlapping regions enclose between them a space which is open in the conveying direction and with acsending conveying will necessarily fill with material. On bending of the leading plate, due to the sealing strip disposed at the rearward end of each plate, the material will at least partially again be pushed out of the overlapping region. However, this leads to a very pronounced wear.

SUMMARY OF THE INVENTION

The invention is based on the problem of further developing the plate belt conveyor according to the preamble in such a manner that a belt providing maximum sealing is obtained with the minimum possible wear thereof. The belt is to be suitable for steeply ascending conveying, in particular for conveying systems whose conveying angle is steeper than the natural angle of repose of the material to be conveyed. In practice, the plate belt conveyor is to be suitable for conveying angles above 35°, preferably for conveying angles above 40°.

To solve this problem, according to the invention, at the front portion of the rear overlapping region, in the conveying direction, an upward arched bulging is provided. The arch bulging is formed in such a manner that on mutual pivoting of the plates when the belt is reversed i.e. reversal region, over a first angular region, the sealing between the bulging and the lower end of the downward directed leg is retained and the pocket does not open until after exceeding the first angular region.

In contrast to the known prior art which discloses a generally closed pocket which opens as soon as successive plates in the reversal region begin to assume to each other an angle not equal to 0°, the pocket in the present invention only opens when a predetermined angle between successive plates has been exceeded. Thus, in the case of the present invention, the pockets do not open until a later instant. As a result, in the present invention, the pockets do not open until the (leading) plate forms an angle with the horizontal which is substantially less than the inclination angle of the plate belt conveyor. The leading plate on opening of the pocket is already being aligned horizontally or inclined opposite to the inclination of the plate belt conveyor.

In the present invention, the pocket present in the overlapping region of the plates thus remains closed until the inclination of the leading plate becomes appreciably less than the inclination of the conveyor. Thus, the danger of material sliding into the pocket and possibly shooting beyond the rear upward directed leg due to the inclination of the plate when the pocket is opened is greatly reduced or completely eleminated.

Since, in practice, a gap between the lower end of the downward directed leg and the opposite plate, however small, will always be present. The material lying in the ascending conveying, in the region of the gap on the plate belt, will tend to move into the gap. This effect is all the more pronounced due to the so-called polygon effect which causes a vibration of the plate belt which promotes penetration of the material into the gap. A further advantage of the arrangement according to the invention is that as soon as the leading plate, in the region of the upper chain wheel, starts to pivot with respect to the following plate, the downward directed leg of the following plate yields to the material so that the material merely follows the downward directed leg. However, the material is not drawn into the slot present there, which would mean considerable wear, as is the case in the known designs described above.

Furthermore, with the arrangement according to the invention, advantageously as soon as the pocket opens, the upward arched bulging lies substantially horizontal, so that any material penetrating through the slot remains on the substantially horizontal surface. In contrast to the prior art, the material is not caused to shoot rearwardly.

According to a further advantageous feature of the invention, the plates comprise in their rearward overlapping region a bead. The bead extends parallel to the plate transverse edge and the front flank of which forms the upward arched bulging. Such a transversely extending bead has the additional advantage that the plate is stiffened thereby as is important in particular with plate widths above 100 cm.

Preferably, the cross-section of the upward arched bulging is curved circularly, the center of curvature coinciding with the chain fulcrum. Such an arrangement represents the solution which is mechanically simpliest to implement.

A further problem of inadequate sealing with steeply ascending conveying is encountered in the region of the side rims. In plate belt conveyors for steep conveying, it is known to make the vertically extending side rims of adjacent plates overlapping in the conveying direction engage in each other in such a manner that the front ends of the side rims of one plate lie between the rear ends of the side rims of the preceding plate. The side rims are slightly inclined to the center line of the plate belt conveyor in the conveying direction, so that the distance between the ends of the side rims lying at the front, seen in the conveying direction, is less than the distance between the respective rearward disposed ends of the side rims. In this manner, the side rims of successive plates may be inserted into each other in an overlapping manner. With a rectilinear path of the plate conveyor, the side rims in the overlapping region lie sealed on each other. When, however, the plates bend in the region of the chain wheel, the side rims move apart in the conveying direction. The greater the distance from the chain fulcrum, the greater the distance through which adjacent rims are moved relatively to each other in the conveying direction. Now, since the side rims are not aligned parallel to the conveying direction, but define an angle with respect thereto, it follows that with increasing relative movement of adjacent rims in the conveying direction, a gap arises between the rims. The gap increasing arises greater than the relative movement of adjacent rims in the conveying direction. Theoretically, at the chain fulcrum or center of rotation, the gap is equal to zero and increases continuously with increasing distance from the chain fulcrum, i.e. with increasing rim height of the belt. Thus, a wedge-shaped gap results which is relatively small at the bottom in the vicinity of the bottom plate and increases upward. Now, when the leading plate runs onto the chain wheel and bends, the belt is still charged so that the material to be conveyed bears on the side rims and tends to slide rearward opposite to the direction of conveying. If, as in the prior art, at this moment a gap arises between the side rims, the gap can easily pass the material therethrough and the belt is inadequately sealed.

To solve this problem, according to the invention, the overlapping side rim regions extend parallel to the conveying direction and the side rims between the overlapping regions have a bead extending over the entire height of the side rims.

With such a configuration of the side rims, the side plates can no longer be conically inserted into each other as in the prior art, but on the contrary, are somewhat bent so as that on the other hand, an overlapping of the side rims is possible, but the side rims are parallel to each other. As a result, when the plates angle in the deflection region, a gap is no longer formed between the side rims. The arrangement is thus sealed in the deflection and discharge regions as well. The bead, provided according to the invention, extends over the entire height of the side rim and is inward directed. The bead has the effect of shielding the sealed region from sliding material so that, even if a gap should arise between the side rims, the material has only a small tendency to move into the gap. The bead, according to the invention, is therefore also advantageous in cases in which the side rims are inclined to the conveying direction as described above.

Expediently, according to a further feature of the invention, the leading edges, in the conveying direction, of the side rims may be outwardly bent and lie sealed on the side rims of the preceding plate. This further promotes the sealing properties of the plate belt and further reduces wear.

Further advantageous features of the invention will be apparent from the remaining subsidiary claims in conjunction with the following description in which several examples of embodiment of the invention are explained in detail with the aid of the drawings.

DESCRIPTION OF THE DRAWINGS

In the drawings, in partially schematic illustration.

DESCRIPTION OF THE PREFERRED EMBODIMENTS

Figure 1:
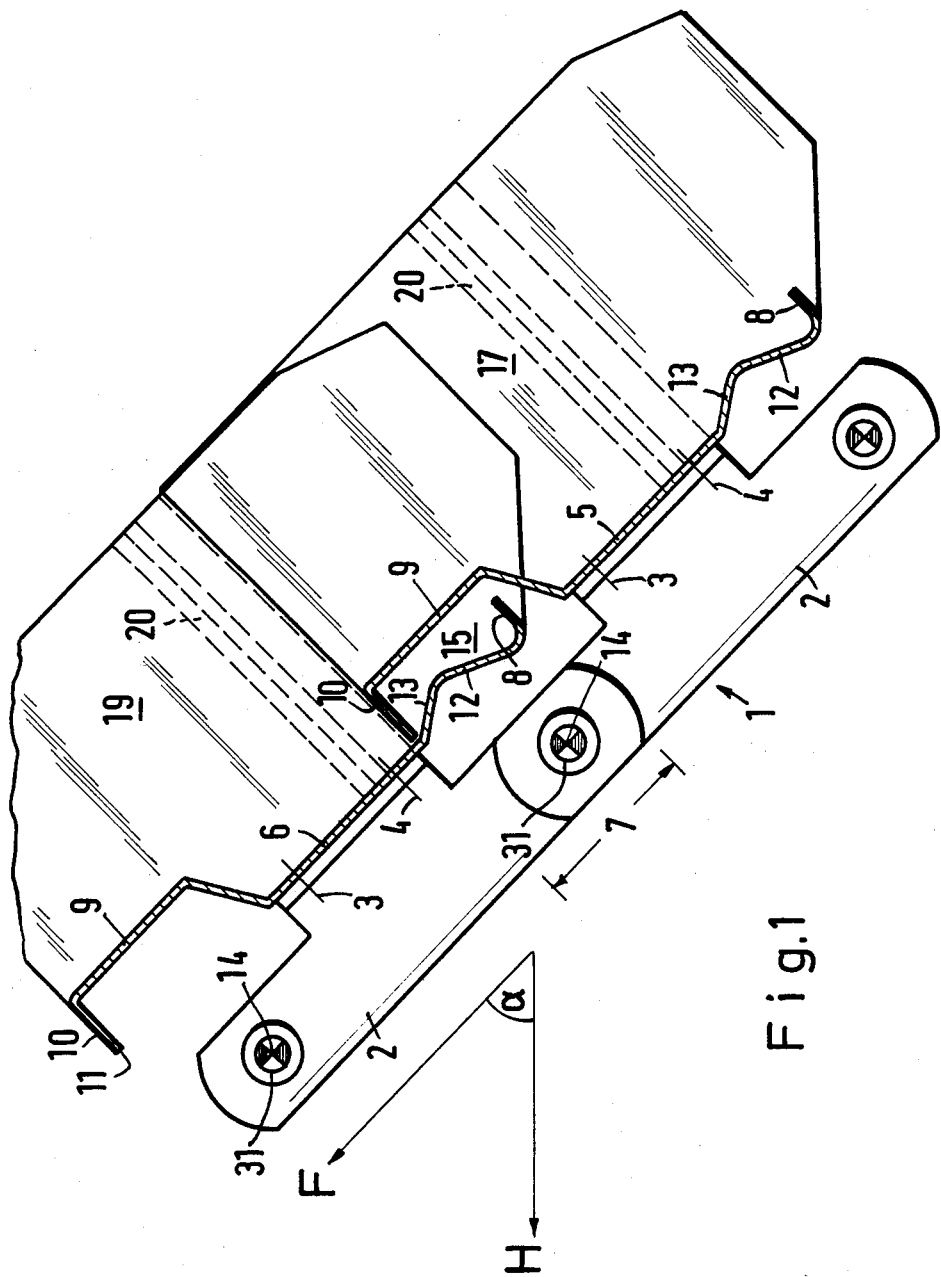
FIG. 1 shows a section through two corresponding plates of a plate belt conveyor, the plates being aligned parallel to each other.
Figure 2:
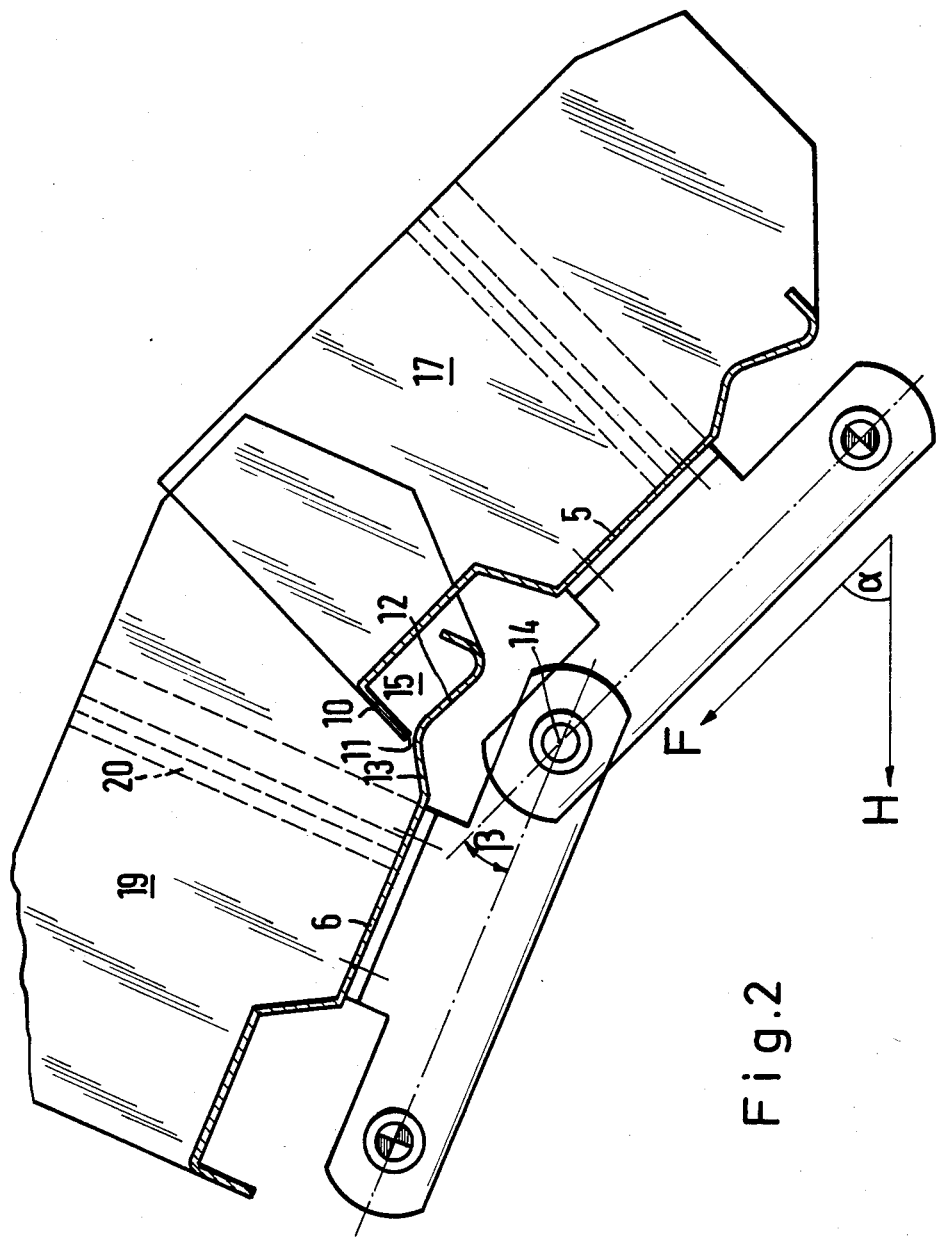
FIG. 2 shows a section corresponding to FIG. 1, the plates being inclined with respect to each other by a predetermined angular amount.
Figure 3:
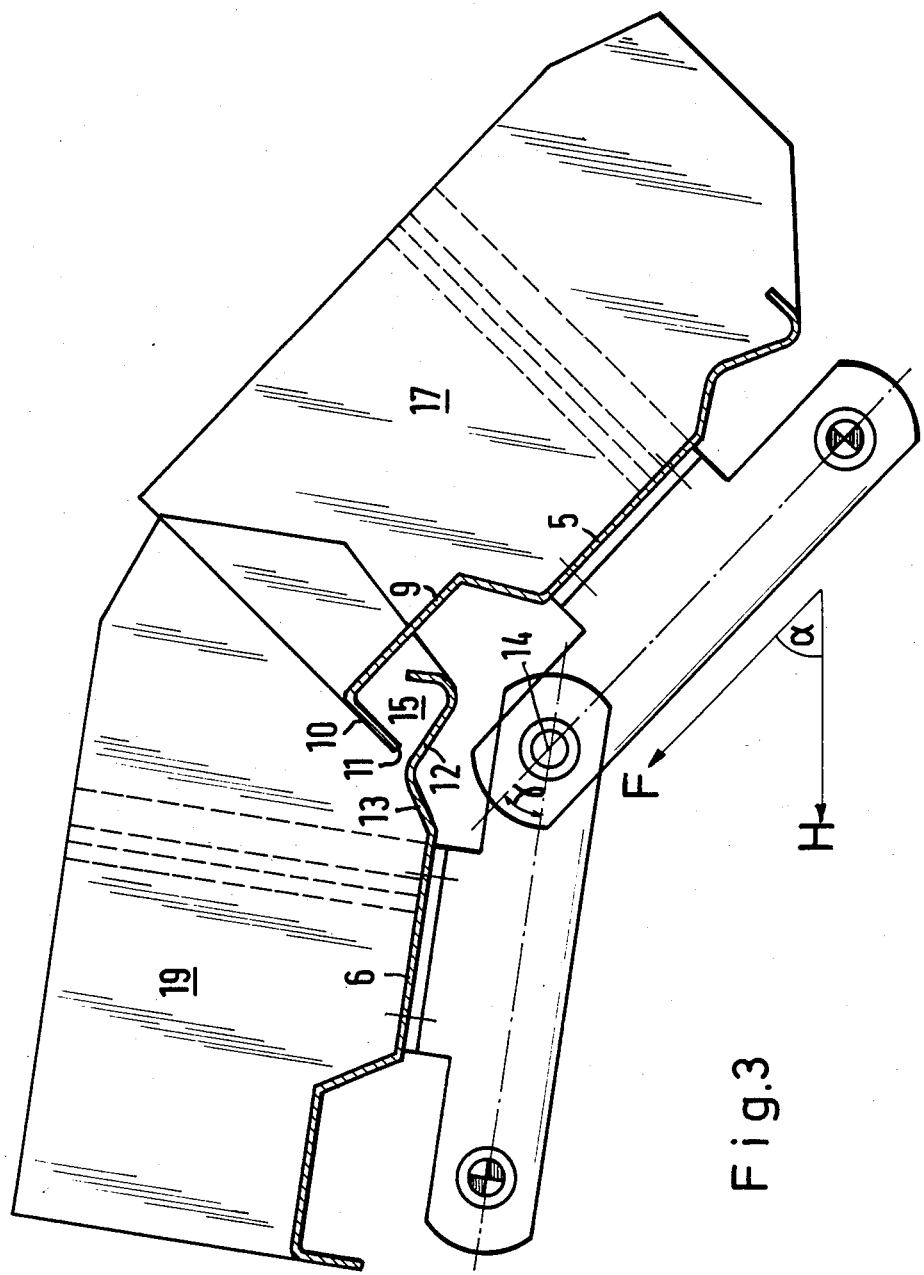
FIG. 3 is a section according to FIG. 2, the plates being bent still more greatly than in FIG. 2.

Reference will first be made to FIGS. 1 to 3. The plate belt, constructed as short cell belt, is secured to a flat link chain 1 whose individual link plates 2 are articulately connected to each other via chain pins 31. Plates 5, 6 are secured to link plates 2 via securing means 3, 4. The pitch of plates 5, 6 correspond to the pitch of the chain.

The conveying direction forms an angle $\alpha$ with the horizontal H. Angle $\alpha$ is of the order of magnitude of 45°, so that the conveying involved is a very steep one.

As clearly apparent from FIG. 1, two adjacent plates 5, 6 overlap each other in an overlapping region 7. Each plate 5, 6 is provided at its rearward end, seen in the direction of conveying, with a leg 8 which is perpendicularly upwardly aligned relative to the plate surface. This leg 8 is spanned by a roof-shaped arch 9 which terminates at its leading end, in the conveying direction, with a perpendicularly downward directed leg 10. When the plates 5, 6 as illustrated in FIG. 1 are arranged parallel to each other, the lower transverse edge 11 of the downward directed leg 10 lies just above the plate bottom or bears on the latter.

In the region beneath the roof-shaped arch 9, the rearward end of plate 5, 6 comprises an upward arched bead 12 extending in the transverse direction of the plate. The forward directed flank of the bead 12 is formed a bulge 13. The bulge 13 circularly arcuate and the radius of curvature coincides with the respective associated chain fulcrum 14. The bulge 13, of circular arcuate cross-section, extends substantially from the bottom of the respective plate up to the apex of the bead 12. The rearward descending flank of the bead merges into the upward directed leg 8. Between the bead 12, leg 8, arch 9 and leg 10, a pocket 15 is formed, which as apparent from FIG. 1, is closed when the plates extend rectilinearly.

Now, when the plate belt reaches the upper chain wheel, i.e. the discharge and reversal region, the chain link plates 2, and thus the plates 5, 6, pivot with respect to each other in the manner represented in FIGS. 2 and 3, where FIG. 2 shows an intermediate stage at which the full pivoting of the plates relative to each other has not yet been reached.

As apparent from FIG. 2, the plate 6 has pivoted relative to the plate 5 through an angle $\beta$. At this angle $\beta$ the lower transverse edge 11 of the leg 10 has reached the apex of the bead 12, i.e. the rearward end of the bulge 13, without the gap between the leg 10 and bulge 13 having been opened, i.e. up to the angular region illustrated in FIG. 1, the pocket 15 remains closed. Consequently material cannot penetrate, or can only negligibly penetrate, the pocket 15.

Only when the front plate 6 has pivoted further, with respect to the rear plate 5, finally reaching the maximum pivot position, illustrated in FIG. 3 where the angle enclosed by the two plates 5 and 6 has reached its maximum value $\gamma$, does the pocket 15 open such that the lower transverse edge 11 lifts off the bead 12. Since, however, the leading plate has now already reached a lesser inclination to the horizontal, the material exhibits relatively little tendency to run into the now open pocket. On further circulation of the plate round the chain wheel, the material is discharged and the opened pocket can empty.

Figure 4:
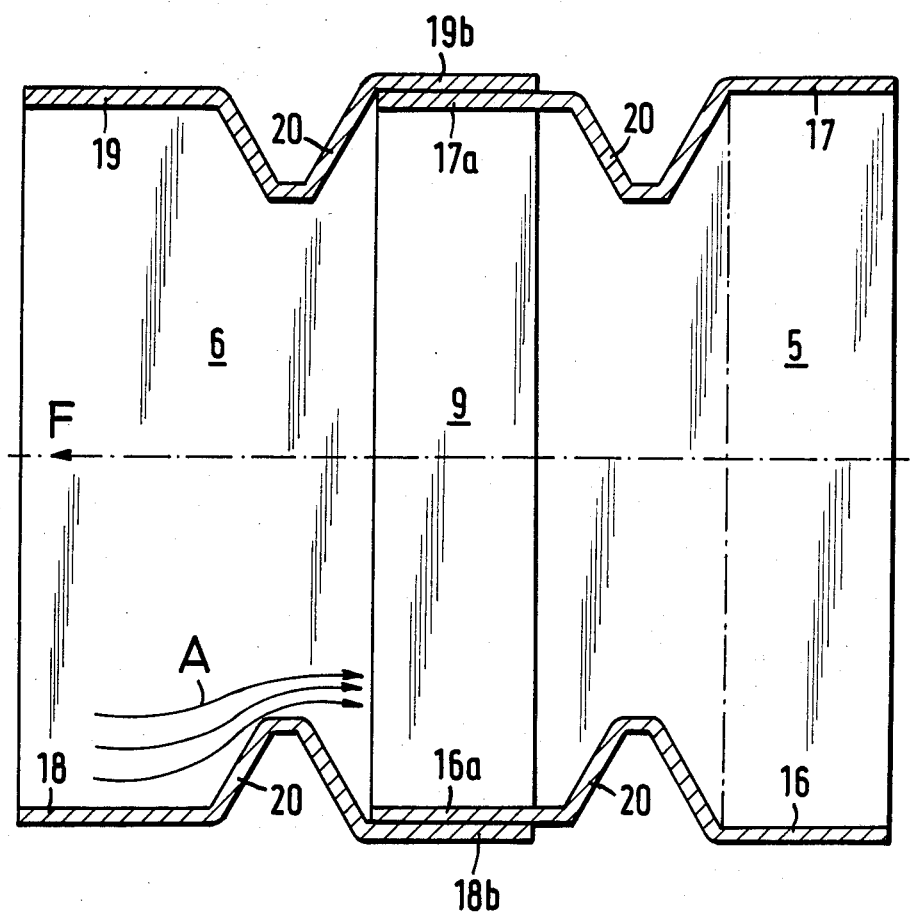
FIG. 4 is a schematic plan view of two corresponding plates showing the interengaging of the side rims of the plates.
Figure 5:
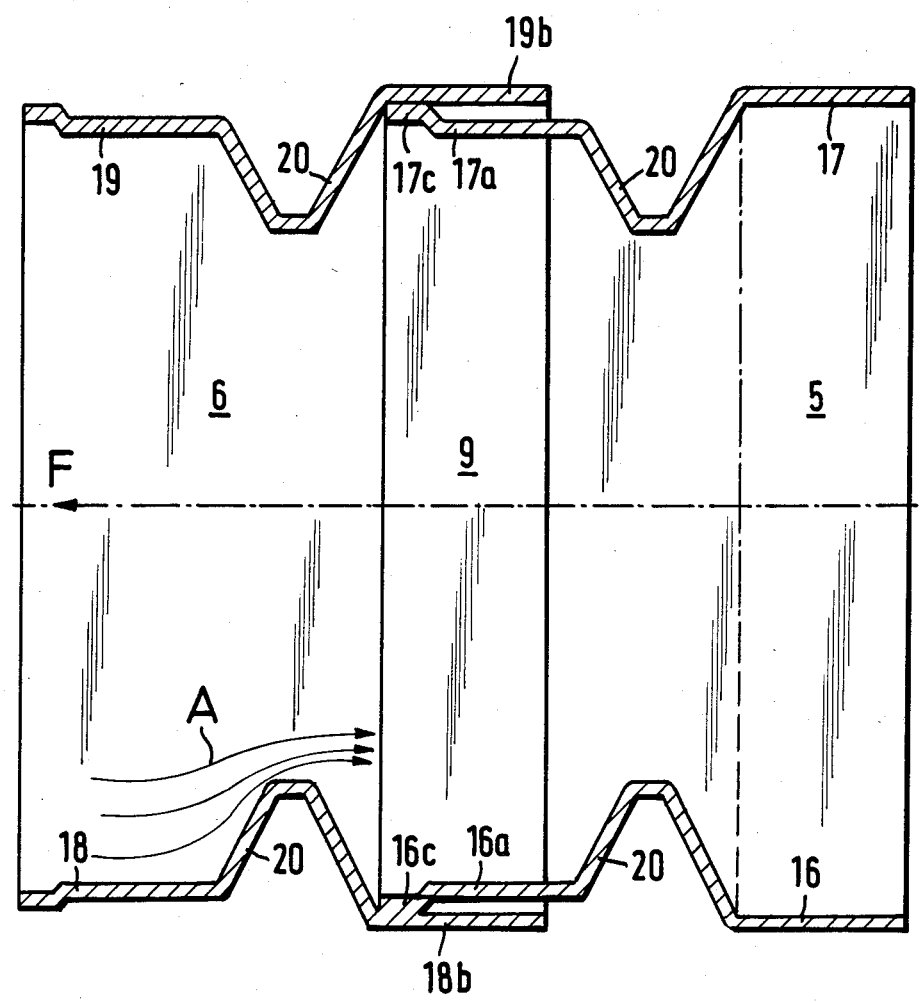
FIG. 5 is a schematic plan view according to FIG. 4 of an alternative embodiment.

FIGS. 4 and 5 show the overlapping arrangement of the side rims 16, 17 and 18, 19 of successive plates 5, 6. The side rims 16, 17 and 18, 19 of a plate 5 and 5 respectively are so formed that the regions 16a, 17a of the rearward plate 5, in the direction of conveying F, engage between the rear regions 18b, 19b of the leading plate 6 and bear sealingly thereon. FIG. 4 shows a mutual arrangement of the side rims corresponding to the relative plate position shown in FIG. 1, i.e. adjacent plates 5, 6 are aligned parallel.

If adjacent plates 5, 6 are now pivoted relative to each other than in the region where the conveyor reverses itself and travels in the opposite direction, the upward lying regions of the side rims of adjacent plates move apart. As readily apparent from FIG. 4, the overlapping seal of the side rims is however retained in the overlapping region since all plate regions 16a, 17a, 18b, 19b contributing to the overlapping are made parallel.

As clearly apparent from FIG. 4, the side rims 17 to 18 each have in the center a perpendicularly extending pronounced bead 20 projecting in each case into the interior of the belt. The bead 20 effects that material sliding downward from the overlap of the side rims, i.e. in particular, from the leading edges of the side rims, in the conveying direction, which are critical for sealing. Thus, the material is deflected in the manner indicated in FIG. 4 by the arrow A.

The leading edges 16c, 17c, in the conveying direction, of the side rims are slightly outwardly bent in the embodiment of the FIG. 5 so that, in the overlapping region between the side rims, a large-area seal is not present but rather a. substantially strip-shaped seal is present which compared with a large-area seal can be realized with narrower tolerences.

We claim:

1. Plate belt conveyor for steep conveying comprising:

mutually overlapping plates being disposed on flat link chains and having a pitch which equals the spacing between successive chain links, each of said plates in the regions where they overlap being provided at their transverse edges at one end with an upward directed leg and at the other end with a roof-like arch from which a steeply downward directed leg extends, each said roof-like arch spanning the upward directed leg of the corresponding overlapped plate, each said downward directed leg together with said roof-like arch and said upward directed leg of the corresponding overlapped plate forming a pocket which opens when the conveyor belt reverses its direction of travel by passing around an end sprocket, each said lower end of the downward directed leg of the upper overlapping plate lying in a sealing manner on the corresponding lower overlapping plate when the upper and lower overlapping plates are arranged parallel to one another, each said lower end of the downward directed leg maintaining at most a slight spacing with the corresponding lower overlapping plate, each said lower overlapping plate at its one end having an upward arched bulging beginning directly behind a point where the lower end of the downward directed leg of the corresponding upper overlapping plate lies on the lower overlapping plate, the arched bulging being curved arcuately in cross-section wherein on mutual pivoting of said plates when the conveyor belt passes around the end sprocket, the sealing between the arched bulging and the lower end of the corresponding downward directed leg is maintained as the lower end of the downward directed leg pivots about the corresponding arched bulging, the pocket opening only after the lower end of the downward directed leg of the upper overlapping plate, passes an apex of the corresponding arched bulging.

2. Plate belt conveyor according to claim 1, wherein said plates have in their rearward overlapping region a bead which extends parallel to the plate transverse edge and the front flank of which forms said arched bulging.

3. Plate belt conveyor according to claim 1 or 2, wherein the center of curvature of the arched bulging coincides with a fulcrum of said flat link chains.

4. Plate belt conveyor for steep conveying according to claim 1, the overlapping plates having vertically extending side rims of adjacent plates overlapping in conveying direction engaging in each other in such a manner that the front regions of said side rims of one plate lie between the rear regions of said side rims of the following plate, wherein the overlapping side rim regions extend parallel to the conveying direction and wherein said side rims comprise between the overlapping regions, an inward directed bead extending over the entire height of said side rims.

5. Plate belt conveyor according to claim 4, wherein said bead is substantially disposed in the center between said side rim ends.

6. Plate belt conveyor according to claim 4 or 5, wherein leading edges in the conveying direction, of said side rims are outwardly bent or angled and lie sealed on said rear side rim regions of the preceding plate.

* * * * *